Oct. 25, 1949.                M. L. JURASEVICH                2,486,167
                                  CORD WINDER
                              Filed June 14, 1948
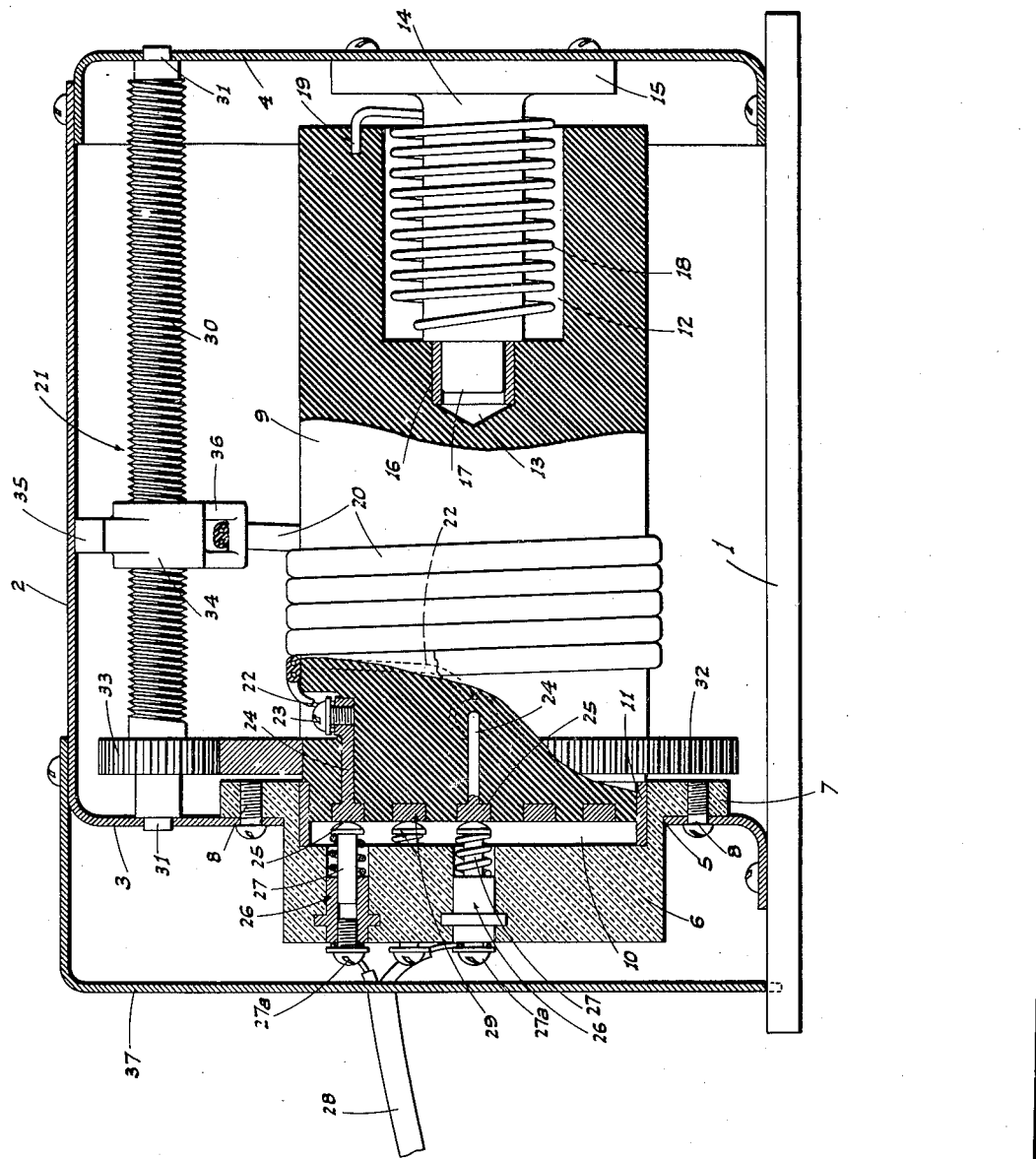
INVENTOR
M. L. Jurasevich
BY
ATTORNEYS Patented Oct. 25, 1949

2,486,167

UNITED STATES PATENT OFFICE 2,486,167

CORD WINDER

Mitchell L. Jurasevich, Alturas, Calif., assignor to Elsie Myrtle Jurasevich, Alturas, Calif.

Application June 14, 1948, Serial No. 32,855

1 Claim. (Cl. 191—12.2)

This invention is directed to, and it is an object to provide, a device for winding in and retaining excess cord of electrical appliances, especially of portable type, such as vacuum cleaners, irons, telephones, radios, radio or public address system microphones, or the like.

Another object of the invention is to provide a cord winder which includes spring-actuated winding mechanism which operates automatically to take up any slack in the electric cord between the appliance and the cord winder, thus eliminating the otherwise loose and frequently entangled, condition of said cord therebetween.

A further object of the invention is to provide a cord winder which embodies a novel collector ring assembly between the cord winding drum and the terminal block of the device, whereby current may flow through the device at all times, including those periods when the drum may be revolving.

An additional object of the invention is to provide a cord winder which includes a novel mount, and spring drive for the cord winding drum; there being means to level-wind the cord on the drum.

It is also an object of the invention to provide a cord winder in which the mount for the cord winding drum, as in the preceding paragraph, includes the dielectric terminal block; the latter being at one end of the drum and having a circular recess in which an adjacent drum trunnion is journaled.

A further object of the invention is to provide a simple, practical, and convenient cord winder, and one which will be exceedingly effective for the purpose for which it is designed.

These objects are accomplished by means of such structure and relative arrangement of parts as will fully appear by a perusal of the following specification and claim.

The figure of the drawing is a longitudinal sectional elevation of the novel cord winder.

Referring now more particularly to the characters of reference on the drawing, the novel cord winder comprises a base 1 on which a box-like sheet metal housing 2 is mounted; such housing including ends 3 and 4.

The end 3 of the housing is formed therein with an enlarged opening 5 through which a porcelain or otherwise dielectric terminal block 6 projects into the housing 2. Within the housing 2 the terminal block 6 includes flanges 7 secured to the end 3 of the housing by screws 8. In this manner the terminal block is fixed with respect to the housing 2.

Between the terminal block 6 and the opposite end 4 of the housing, the latter encloses an elongated drum 9 of a dielectric material, such as Bakelite. The terminal block 6 is formed with an inwardly opening circular recess 10 having a low friction bushing 11 secured peripherally therein; the adjacent end of the drum 9 being journaled in said bushing 11 in rotatable relation.

The opposite end of the drum 9 is supported from the end 4 of the housing 2 as follows:

Said opposite end of the drum 9 is formed with a relatively large-diameter bore 12 reduced in diameter, at its inner end, as a smaller bore 13.

A spindle 14 is attached by a base 15 to the end 4 of the housing, and said spindle 14 thence projects into the axial bore 12 in clearance relation. The reduced-diameter bore 13 has a low friction bushing 16 secured peripherally therein, and a trunnion 17 on the inner end of the spindle 14 is journaled in said bushing.

With the above arrangement the drum 9 is effectively mounted for rotation in the housing 2.

A helical torsion spring 18 is disposed in the axial bore 12 about the spindle 14; being anchored at one end to the latter, and anchored at the other end to the drum 9, as at 19. This spring 18 provides a spring motor for the drum 9, rotation of said drum in one direction loading the spring so that it then tends to drive or rotate the drum in the opposite direction.

The flexible cord 20 of the appliance (not shown) leads into the housing 2 through a suitable longitudinal side slot (also not shown), and thence is level-wound about the drum 9; the level-winding mechanism, indicated generally at 21, being hereinafter described in detail.

The inner end of the level-wound flexible cord 20 is adjacent the left hand end of the drum 9, and the wires 22 of said cord are connected to corresponding recessed terminal screws 23 in said drum. The terminal screws 23 are threaded into connector bars 24 which extend in the drum toward the end adjacent the terminal block 6, and at such end the bars 24 merge with exposed corresponding collector rings 25. In other words, there is a collector ring 25 corresponding to each bar 24, and the bars 24 in turn being electrically connected by the screws 23 with the separate ones of the wires 22.

The terminal block 6 is fitted with contact units 26 corresponding to the radially spaced collector rings 25, and having spring-pressed contact pins 27 riding said collector rings. At their outer ends the contact units 26 include terminal screws 27a to which the separate wires of an input cord 28 are connected.

By reason of the above collector ring and contact unit assembly, the input cord 28 remains constantly in proper electrical connection with the flexible cord 20 whether the drum 9 be stationary or rotating.

If the device is used in a three-phase circuit, the collector ring and contact unit assembly will include an additional collector ring and contact unit, indicated generally at 29.

For the purpose of level-winding the flexible cord 20 onto the drum 9 as said cord pays off onto said drum there is provided this level winding mechanism 21, which comprises:

An elongated screw 30 extends parallel to the drum 9 above the same, and at its ends said screw includes trunnions 31 rotatably bearing in the ends 3 and 4 of the housing. The screw 30 is driven from the drum 9 by a gear 32 on said drum in mesh with a pinion 33 on the screw.

A nut 34 is threaded on the screw 30 for travel therealong, and rotation of said nut is prevented by means of a guide 35 which runs on the under side of the top of the housing. At the bottom thereof the nut 34 includes an eye 36 through which the flexible cord 20 passes.

Upon rotation of the drum 9 in one direction, with the cord 20 paying off the drum 9, the nut 34 and eye 36 travel in the direction of the gear 32. When the drum 9 runs in the opposite direction, to pull in the flexible cord 20, the nut 34 and eye 36 travel from left to right, winding said cord level, with the turns in close side by side relation, onto said drum.

When the device is in use, it is disposed at a convenient point and the base 1 is preferably anchored to the floor or the like. Thereafter, as the portable appliance (not shown) to which the flexible cord 20 leads, is moved from place to place, the device automatically maintains the cord relatively taut and prevents any loose play or entangling therein. When the flexible cord 20 is pulled out of the device, the spring 18 is loaded to provide the power source for rotating the drum 9 to pull back the cord when the appliance is moved closer to the device.

Throughout these movements of the appliance, the described novel collector ring and contact unit assembly maintains unbroken electrical connection between the input cord 28 and the flexible cord 20. The input cord 28 is of course provided with a suitable plug or the like for engagement in an output receptacle.

The device provides a very practical and convenient instrumentality for the intended purpose; the structure being such that it is reliable and long-lived, without servicing or repair.

From the foregoing description it will be readily seen that there has beeen produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

An electric cord winder comprising a housing, a spindle fixed to one end of the housing and projecting into the housing, a dielectric terminal block fixed to the opposite end of the housing and provided with an annular recess in its inner face opening into the housing, yieldable contact pins in the block and projecting into said recess, a dielectric drum, one end of the drum projecting into said recess and journaled for rotation therein, contact rings embedded in that end of the drum which projects into said recess, the contact points riding said rings, an electric cord reeved about the drum and projecting out of the housing, the terminals of said cord being connected with the contact rings at points within the peripheral confines of the drum, the drum being provided with a bore in the other end thereof, such bore receiving said spindle therein and the inner end of the spindle being journaled in the body of the drum at the inner end of the bore, and a spring motor disposed about the spindle within the bore and connected at one end to the spindle and at the other end to the drum.

MITCHELL L. JURASEVICH.

REFERENCES CITED

The following references are of record in the file of this patent:

UNITED STATES PATENTS

| Number | Name | Date |
|---|---|---|
| 351,488 | Bowyer | Oct. 26, 1886 |
| 1,159,124 | Steen | Nov. 2, 1915 |
| 1,216,319 | Huling | Feb. 20, 1917 |
| 1,397,633 | Hite | Nov. 22, 1921 |
| 1,659,160 | Richards | Feb. 14, 1928 |
| 1,747,411 | Anderson | Feb. 18, 1930 |
| 1,770,454 | Beck et al. | July 15, 1930 |